United States Patent [19]

Kallin et al.

[11] Patent Number: 4,888,481
[45] Date of Patent: Dec. 19, 1989

[54] ALIGNING AND PROTECTIVE COVER FOR A MOTOR

[75] Inventors: Fredrik L. N. Kallin, Kitchener; Bruce A. Reid, Elmira, both of Canada

[73] Assignee: NCR Corporation, Dayton, Ohio

[21] Appl. No.: 286,407

[22] Filed: Dec. 19, 1988

[51] Int. Cl.$^4$ ............................................. G01D 5/34
[52] U.S. Cl. ............................ 250/231 SE; 250/239
[58] Field of Search ........ 250/231 R, 231 SE, 237 G, 250/239; 310/89

[56] References Cited

U.S. PATENT DOCUMENTS

| | | | |
|---|---|---|---|
| 4,017,771 | 4/1977 | Baumann | 361/357 |
| 4,389,902 | 6/1983 | Kataoka et al. | 250/231 SE |
| 4,517,481 | 5/1985 | Breining | 310/71 |
| 4,562,946 | 1/1986 | Ryan | 250/237 G |
| 4,706,007 | 11/1987 | Nagasaka | 318/687 |
| 4,710,690 | 12/1987 | Reid et al. | 318/685 |
| 4,716,326 | 12/1987 | Fisher | 310/89 |

Primary Examiner—David C. Nelms
Attorney, Agent, or Firm—Wilbert Hawk, Jr; Albert L. Sessler, Jr.; Elmer Wargo

[57] ABSTRACT

An aligning and protective apparatus for a stepping motor which includes a sensor housing having first and second sensor pairs located therein. An aligning cover has a receiving area therein to receive the sensor housing. The first and second sensor pairs are placed apart a predetermined distance in the housing which is positioned on the motor to coact with a timing disk used in controlling the operation of the stepping motor. The cover with the sensor pairs therein is rotated on the motor until the sensor pairs are properly located on the motor to effect the desired lead angle for the motor. The cover is also shaped to protect the sensor pairs and the timing disk from dust.

9 Claims, 4 Drawing Sheets

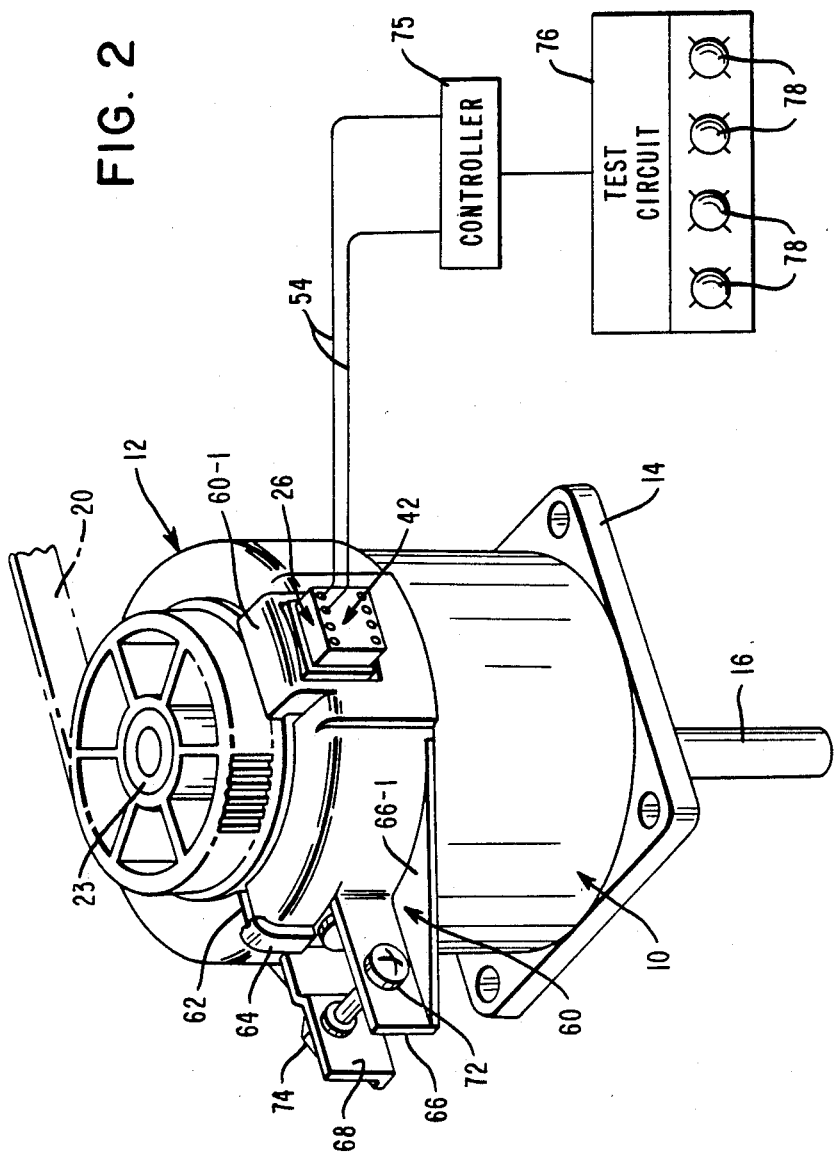

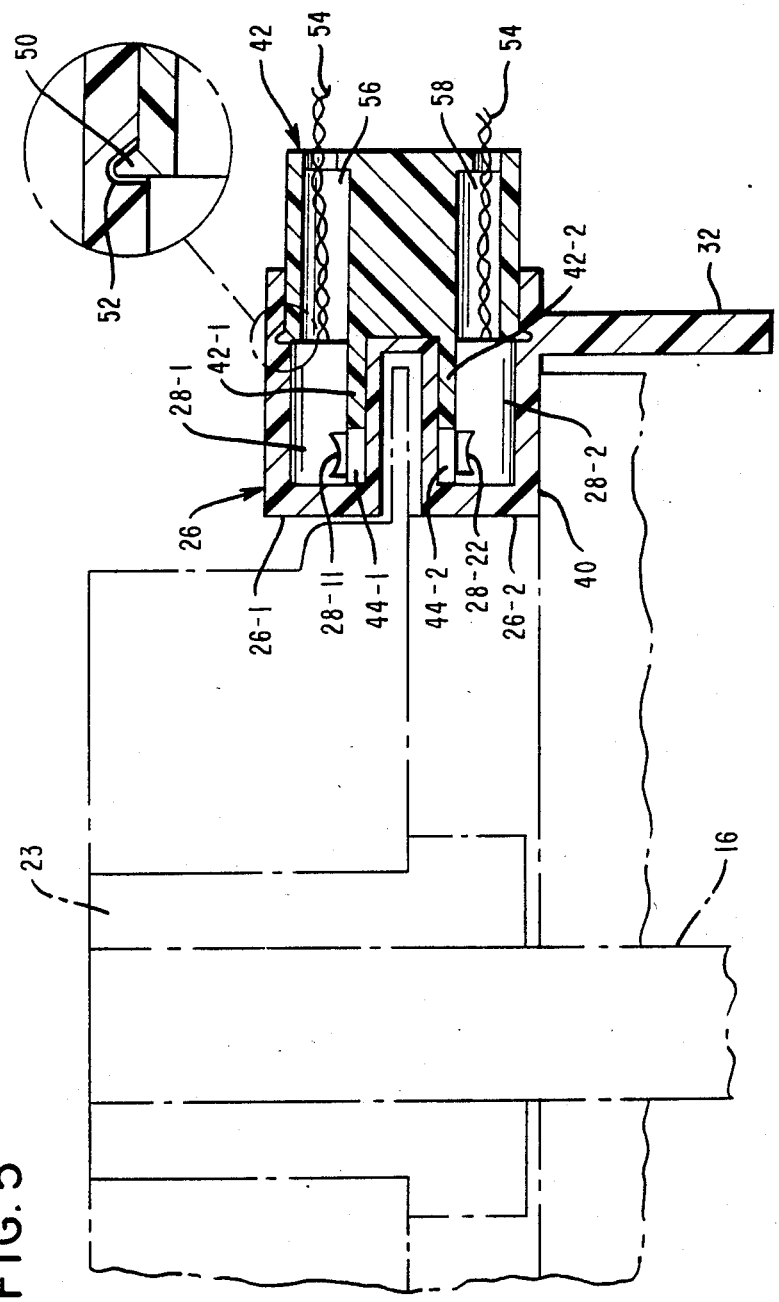

ALIGNING AND PROTECTIVE COVER FOR A MOTOR

BACKGROUND OF THE INVENTION (1) Field of the Invention

This invention relates to an aligning and protective apparatus to be used with a motor like a stepping motor.

(2) Description of the Related Art

Some stepping motors utilize first and second sensors which cooperate with a timing disk which is secured to the output member of the motor. The first and second sensors are utilized to adjust the various lead angles which are associated with the operation of the stepping motor. When the first and second sensors are mounted separately, it is difficult to adjust the sensors so as to effect the appropriate lead angle for the motor. Another problem with the stepping motors is that the output member of the motor is very often a timing pulley which tends to generate a lot of dust particles from the associated timing belt. The dust particles tend to accumulate between the timing disk and the associated light sensors, making frequent cleaning necessary. The cleaning requires machine downtime and maintenance costs which could be expensive.

SUMMARY OF THE INVENTION

In contrast with the above, the present invention obviates the problems mentioned. The apparatus of this invention includes a housing in which the two sensors are mounted and accurately located relative to each other. The housing is placed within a cover and mounted on the stepping motor. The cover with the housing therein is mounted on the motor so that the cover with the sensors therein is rotated relative to the motor until the proper lead angle is obtained. Thereafter, the cover is locked against movement relative to the motor.

An advantage of this invention is that only one adjustment is required.

Another advantage is that the time for making the adjustment is greatly reduced compared to the prior art method.

Still another advantage is that the cover provides a multi-function element; it keeps dirt away from the timing disk associated with the motor and the two sensors, also facilitates the adjusting of the sensors.

In a first preferred embodiment of the invention, there is provided an aligning and protective apparatus (hereinafter referred to as apparatus) for a motor, said motor having:

a cylindrical housing and an end portion joining said cylindrical housing to form a circular rim, an output member extending from said end portion; and a timing member fixed to said output member to rotate therewith;

said apparatus comprising:

a sensor housing having at least one sensor therein to coact with said timing member when said sensor housing is positioned on said motor; and a cover means for adjustably securing said sensor housing on said motor;

said cover means being generally circular in shape to cover an area of said end portion, an area of housing, and said circular rim; said cylindrical said cover means having a receiving area therein to receive said sensor housing;

said cover means being discontinuous in one area thereof to enable said cover means to be expanded to facilitate mounting said cover means with said sensor housing therein on said motor; and said cover means having locking means for adjustably locking said cover means on said motor after said cover means is rotated on said motor so as to position said sensor in said sensor housing in operative relationship with said timing member and said motor.

In a second embodiment of the invention, there is provided an apparatus comprising:

a stepping motor having a cylindrical housing and an end portion, with said end portion joining said cylindrical housing to form a circular rim;

an output member extending from said end portion;

a timing disk fixed to said output member to rotate therewith;

a sensor housing having first and second sensor pairs located therein and also having a flange member secured to said sensor housing to enable said first and second sensor pairs to coact with said timing disk when said flange member is seated on said circular rim;

a cover means for adjustably securing said sensor housing on said motor;

said cover means being generally circular in shape to cover an area of said end portion, an area of said cylindrical housing, and said circular rim;

said cover means having a receiving area therein to receive said sensor housing;

said cover means being separated along a separation line in one area thereof to enable said cover means to be expanded to facilitate mounting said cover means with said sensor housing therein on said motor; and said cover means having locking means for adjustably locking said cover means on said motor after said cover means is rotated on said motor so as to position said first and second sensors in said sensor housing in operative relationship with said timing disc and said motor.

These advantages, and others, will be more readily understood in connection with the following specification, claims, and drawing.

BRIEF DESCRIPTION OF THE DRAWING

FIG. 2 is a view, similar to FIG. 1, showing a cover made according to this invention, and also showing the locking means to enable the sensors within the housing to be fixed relative to the motor;

FIG. 5 is a cross-sectional view, taken along the line 5—5 of FIG. 4 to show additional details of the apparatus shown in FIG. 4; and FIG. 6, shown on the sheet containing FIGS. 3 and 4, shows an enlarged view of a portion of the apparatus shown in the circle in FIG. 5.

DESCRIPTION OF THE PREFERRED EMBODIMENT

Figure 1:
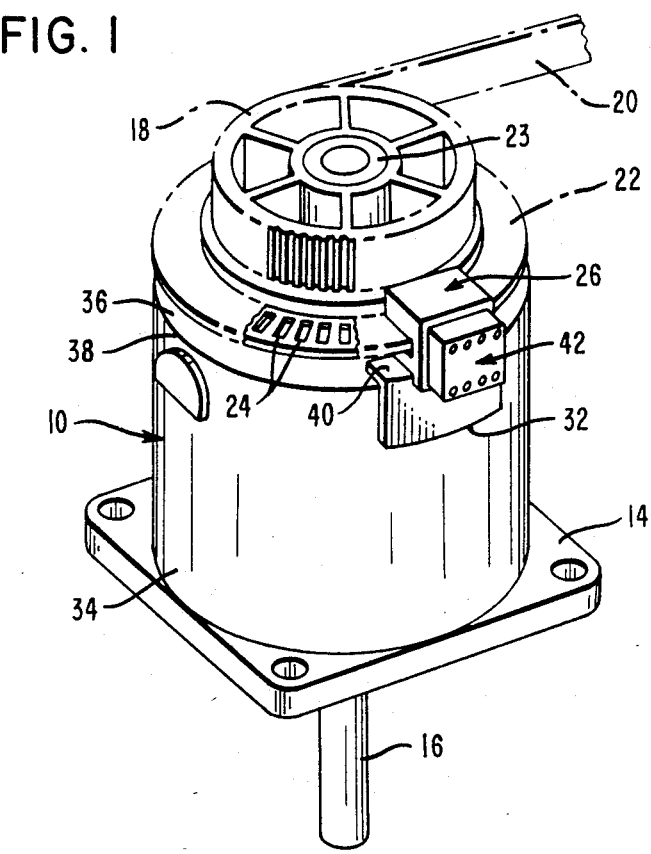
FIG. 1 is a general, perspective view of a stepping motor, showing its associated output member and timing disk, and also showing a sensor housing made according to this invention.

FIG. 1 shows a typical stepping motor 10 which may receive the aligning and protective apparatus of this invention which is designated generally as apparatus 12 (FIG. 2). The motor 10 includes a mounting flange 14, an output shaft 16, and an additional output member, like the timing pulley 18 which is fixed to the output shaft 16 to rotate therewith. The timing pulley 18 drives a timing belt 20 which drives a device (not shown) as is done conventionally. The motor 10 also includes a timing disk 22 which includes a plurality of radially-aligned timing slots 24 which coact with sensors included in the sensor housing 26. The timing disk 22 is secured to a metal hub 23 (FIG. 5) which is secured to the output shaft 16.

The sensors included in the housing 26 are used to set the lead angles associated with the stepping motor 10. A useful definition of a stepping motor is that it "is a motor possessing the ability to rotate in either direction as well as start and stop at various mechanical rotational positions, and whose shaft (rotor) moves in precise angular increments for each excitation change or step." U.S. Pat. No. 4,710,690, which is assigned to the same assignee as is this application, discusses first and second sensors which are used in energizing a stepping motor. The present apparatus 12 facilitates aligning the first and second sensors so as to effect certain lead angles in the energization of the motor.

Figure 4:
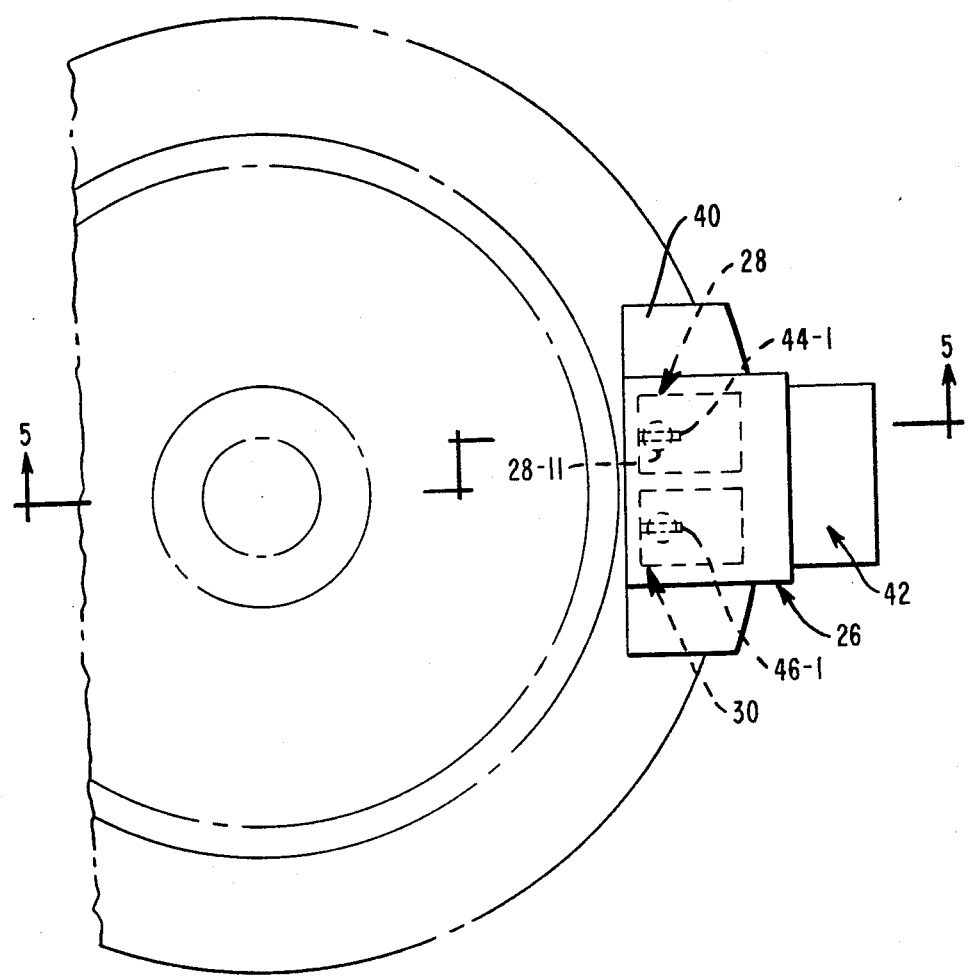
FIG. 4 is a plan view, looking down on a portion of the apparatus shown in FIG. 1.

The first and second sensors alluded to are actually first and second sensor pairs 28 and 30 shown in dashed outline in FIG. 4. Sensor pair 28 includes a light emitter 28-1 and a light detector 28-2 which are shown in FIG. 5. The light emitter 28-1 has a spherical lens 28-11 formed therein to direct light at the light detector 28-2 positioned in opposed relation with the light emitter 28-1. The light detector 28-2 also has a spherical lens 28-22 formed therein to gather light from the light emitter 28-1. The sensor pair 30 is exactly the same as sensor pair 28. The light emitter 28-1 and the associated light detector 28-2 included in a sensor pair, like 28, may be reversed from the positions shown in FIG. 5 without affecting the operation of the apparatus 12.

Figure 3:
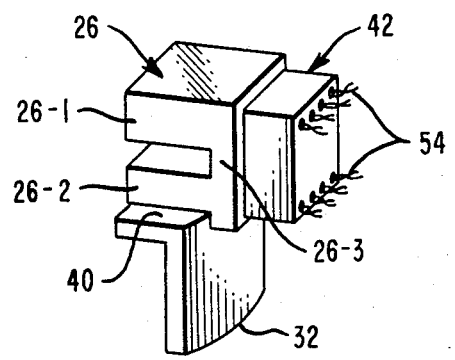
FIG. 3 is a general perspective view, showing the sensor housing shown in FIG. 1.

The sensor housing 26 comprises a first body portion 26-1, a second body portion 26-2, and a joining portion 26-3 which are formed into a general "C" configuration as shown best in FIG. 3. The sensor housing 26 also includes a flange portion 32 which is used to mount the sensor housing 26 on the motor 10. In this regard, the motor 10 has a cylindrical housing 34 and an end portion 36 which joins the cylindrical housing 34 to form the circular rim 38. The flange portion 32 is generally 'L' shaped, having a portion 40 to rest on the circular rim 38, with the flange portion also being arcuately shaped to receive a portion of the cylindrical housing 34 therein. The light emitters 28-1 and 30-1 of the first and second sensor pairs 28 and 30 are located in the first body portion 26-1, and correspondingly, the light detectors 28-2 and 30-2 are located in the second body portion 26-2. The first and second body portions 26-1 and 26-2 are spaced apart as shown best in FIG. 1, for example, to receive the timing disc 22 therebetween.

The sensor housing 26 also has an insert 42 which provides a strain relief for the wires associated with the sensor pairs 28 and 30, and the insert 42 also has a pair of slits associated with each of the sensor pairs 28 and 30. The insert 42 has a general "C" section formed by plates 42-1 and 42-2 which are positioned in opposed relation as shown best in FIG. 5. A pair of slits includes the slit 44-1 located in the plate 42-1 and also includes the slit 44-2 located in plate 42-2, as shown best in FIG. 5. The slits 44-1 and 44-2 are accurately located in vertical alignment in the insert 42, with the associated spherical lens 28-11 being aligned with the slit 44-1 and with the spherical lens 28-22 being aligned with the slit 44-2. There are similar slits associated with the second sensor pair 30, with only the slit 46-1 being shown in FIG. 4. The insert 42 is made of opaque plastic so that the slits mentioned, like 44-1 for example, permit light to pass therethrough: In the embodiment described, the slits, like 44-1 and 46-1, are spaced apart a distance of 5.25 mm on a line which is perpendicular to a radial line of the cylindrical housing 34, with the width of the slits, like 44-1, being 0.25 mm. Naturally, these dimensions are just exemplary for a stepping motor which has a diameter of about 5.64 cm and which has 200 stator poles, for example.

The insert 42 also has a detent 50 which coacts with a recess 52 (FIG. 6) in the housing 26 to conventionally, detachably retain the insert 42 within the housing 26. The housing 26 is a clear plastic member which surrounds the insert 42 as shown in Fig. 5. The housing 26 keeps dust from clogging the slits, like 44-1, in the insert 42, and it also keeps dust from accumulating on the timing disk 22.

To assemble the elements of the sensor housing 26, the wires 54 (FIG. 3) associated with the sensor pairs 28 and 30 are threaded through the openings, like 56 and 58 in FIG. 5, and then the sensor pairs 28 and 30 are positioned on the insert 42. The insert 42 is then pushed into the sensor housing 26 until the detent 50 (FIG. 6) engages the recess 52. The sensor housing is then ready to be installed in the aligning and protective cover hereinafter referred to as cover 60, shown in perspective in FIG. 2.

The cover 60 is generally circular in shape, and it is designed to cover a portion of the end portion 36, a portion of the cylindrical housing 34, and the corner rim 38 of the motor 10 as shown best in FIG. 2. The cover 60 has a cut line, shown as dashed line 62, to enable the cover to be expanded to facilitate mounting the entire apparatus 12 on the motor 10. There is an "L" shaped member 64 which is secured to the cover 60 on one side of the cut line 62; its function is to prevent dust from getting on the timing disk 22 via the cut line 62.

The cover 60 also has a receiving area 60-1 (FIG. 2) therein which is used to house the sensor housing 26 and to maintain the sensor housing in a fixed position on the motor 10 after it is properly aligned thereon as will be described hereinafter. The receiving area 60-1 is generally rectangular in shape and conforms to the external shape of the sensor housing 26 so as to maintain it in a fixed position on the motor 10 when the cover 60 is locked thereon.

The locking means for locking the cover 60 on the motor 10 includes the first and second flange portions 66 and 68 which extend from the cover as shown in FIG. 2. The flange portions 66 and 68 have reinforcing portions, like 66-1, to enable the internal diameter of the cover 60 to be enlarged somewhat by moving the flange portions 66 and 68 away from each other. This movement enables the cover 60 to accommodate the sensor housing 26 when this housing is positioned on the motor 10. The locking means also includes the fastener 72 and a threaded metal insert 74, which, when tightened, are used to lock the cover 60 in place on the motor 10. The threaded metal insert 74 is conventionally, ultrasonically bonded in the plastic cover 60 to keep the insert 74 stationary while the fastener is rotated to lock the cover 60 in place.

The apparatus 12 is installed in the following manner. After the sensor pairs 28 and 30 are installed in the sensor housing 26 as previously described, the sensor housing 26 is placed on the motor 10 as shown in FIG. 1. The timing disk 22 is positioned between the first and second body portions 26-1 and 26-2, with the flange portion 32 resting on the corner rim 38. The aligning cover 60 is then expanded somewhat by pushing the flange portions 66 and 68 apart. While so expanded, the cover 60 is placed over the motor 10, with the receiving area 60-1 aligned with the sensor housing 26, and thereafter, the cover 60 is moved downwardly (as viewed in FIG. 1) to enable the sensor housing 26 to be embraced in the receiving area 60-1. The side of the cover 60 which is opposite to the receiving area 60-1 is then lowered on the motor 10, and thereafter, the flange portions 66 and 68 are released, permitting the cover 60 to wrap around the motor 10. The fastener 72 and metal insert 74 are then tightened somewhat to enable the cover 60 to snugly fit the motor 10, while permitting the whole apparatus 12 to be rotated somewhat on the motor 10.

The apparatus 12 is aligned in the following manner. The wires 54 coming from the sensor housing 26 are fed into the controller 75 which also has a test routine or circuit 76 (Fig. 2) included therein. In the embodiment described, the lead angle for the stepping motor 10 is varied by changing the locations of the first and second sensor pairs 28 and 30 within the sensor housing 26 relative to the stators (not shown) within the cylindrical housing 34. The test circuit 76 operates by giving a visual indication when the sensor pairs 28 and 30 are properly positioned to effect the desired lead angle. When this occurs, a predetermined number of lights 78 are energized by the test circuit 76. The test operator then tightens the fastener 72 to fix the apparatus 12 on the motor 10. Because the test circuit 76 is not a part of this invention, it need not be described in any further detail.

What is claimed is:

1. An aligning and protective apparatus (hereinafter referred to as apparatus) for a motor, said motor having:
a cylindrical housing and an end portion joining said cylindrical housing to form a circular rim,
an output member extending from said end portion; and
a timing member fixed to said output member to rotate therewith;
said apparatus comprising:
a sensor housing having at least one sensor therein to coact with said timing member when said
housing is positioned on said motor; and sensor
a cover means for adjustably securing said sensor housing on said motor;
said cover means being generally circular in shape to cover an area of said end portion, an area of said cylindrical housing, and said circular rim;
said cover means having a receiving area therein to receive said sensor housing;
said cover means being discontinuous in one area thereof to enable said cover means to be expanded to facilitate mounting said cover means with said sensor housing therein on said motor; and
said cover means having locking means for adjustably locking said cover means on said motor after said cover means is rotated on said motor so as to position said sensor in said sensor housing in operative relationship with said timing member and said motor.

2. The apparatus as claimed in claim 1 in which:
said motor is a stepping motor;
said timing member is a timing disk; and
said sensor housing comprises:
a second sensor; and
locating means for locating said one sensor and said second sensor a predetermined distance apart within said sensor housing to facilitate adjusting a lead angle of said stepping motor as said cover means is rotated on said motor.

3. The apparatus as claimed in claim 2 in which:
said sensor housing comprises:
first and second body portions joined together to form a generally "C"-shaped housing; and
a flange secured to said second body portion to enable said circular rim to be received in said flange when said cover means with said sensor housing therein is mounted on said motor; and in which:
said one sensor includes a light source and detector pair which are mounted in opposed operative relationship in said first and second body portions; and
said second sensor includes a light source and detector pair which are correspondingly mounted in opposed operative relationship in said first and second body portions; and
said timing disk is positioned between said first and second body portions of said sensor housing.

4. The apparatus as claimed in claim 3 in which:
said locating means includes an opaque insert which is detachably secured to said sensor housing;
said opaque insert has first and second plates spaced apart in parallel relationship, with each of said first and second plates having first and second slits therein spaced apart in parallel relationship;
said light source and detector pair of said one sensor are located on opposed sides of said first and second plates and are aligned with said first slits in said first and second plates; and
said light source and detector pair of said second sensor are located on opposed sides of said first and second plates and are aligned with said second slits in said first and second plates.

5. The apparatus as claimed in claim 4 in which said locking means comprises:
first and second flange members extending from opposed sides of said one area of said cover means; and
a locking member coupled to said first and second flange members to move said first and second flange members toward each other to thereby secure said cover means on said motor.

6. An apparatus comprising:
a stepping motor having a cylindrical housing and an end portion, with said end portion joining said cylindrical housing to form a circular rim;
an output member extending from said end portion;
a timing disk fixed to said output member to
rotate therewith;
a sensor housing having first and second sensor pairs located therein and also having a flange member secured to said sensor housing to enable said first and second sensor pairs to coact with said timing disk when said flange member is seated on said circular rim;

a cover means for adjustably securing said sensor housing on said motor;

said cover means being generally circular in shape to cover an area of said end portion, an area of said cylindrical housing, and said circular rim;

said cover means having a receiving area therein to receive said sensor housing;

said cover means being separated along a separation line in one area thereof to enable said cover means to be expanded to facilitate mounting said cover means with said sensor housing therein on said motor; and said cover means having locking means for adjustably locking said cover means on said motor after said cover means is rotated on said motor so as to position said first and second sensors in said sensor housing in operative relationship with said timing disc and said motor.

7. The apparatus as claimed in claim 6 in which:

said sensor housing comprises:

first and second body portions joined a generally "C"-shaped housing; and together to form said flange is shaped to said second body portion to enable said circular rim to be received in said flange when said cover means with said sensor housing therein is mounted on said motor; and in which:

said first sensor pair includes a light source and light detector which are mounted in opposed operative relationship in said first and second body portions; and said second sensor pair includes a light source and detector pair which are correspondingly mounted in opposed operative relationship in said first and second body portions; and said timing disk is positioned between said first and second body portions of said sensor housing.

8. The apparatus as claimed in claim 7 in which:

said locating means includes an opaque insert which is detachably secured to said sensor housing;

said opaque insert has first and second plates spaced apart in parallel relationship, with each of said first and second plates having first and second slits therein spaced apart in parallel relationship;

said light source and detector of said first are located on opposed sides of said first and second plates and are aligned with said first slits in said first and second plates; and said light source and detector of said second sensor pair are located on opposed sides of said first and second plates and are aligned with said second slits in said first and second plates.

9. The apparatus as claimed in claim 8 in which said locking means comprises:

first and second flange members extending from opposed sides of said one area of said cover means; and a locking member coupled to said first and second flange members to move said first and second flange members toward each other to thereby secure said cover means on said motor.

* * * * *

UNITED STATES PATENT AND TRADEMARK OFFICE
CERTIFICATE OF CORRECTION

PATENT NO. : 4,888,481

DATED : December 19, 1989

INVENTOR(S) : Fredrik L. N. Kallin et al.

It is certified that error appears in the above-identified patent and that said Letters Patent is hereby corrected as shown below:

Column 5, line 56, after "said", second occurrence, insert --sensor--.

Column 5, line 57, after "and" delete --sensor--.

Column 7, line 24, after "joined" insert --together to form--.

Column 7, line 24, after "and" delete --together to form--.

Column 8, line 16, after "first" insert --sensor pair--.

Signed and Sealed this

Ninth Day of October, 1990

*Attest:*

HARRY F. MANBECK, JR.

*Attesting Officer*    *Commissioner of Patents and Trademarks*